April 28, 1959     W. P. GREEN     2,884,007
MIXING VALVES
Filed March 19, 1954
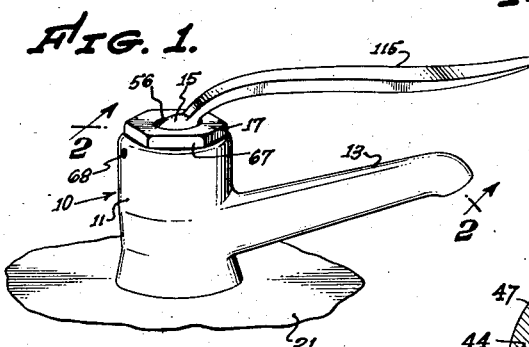
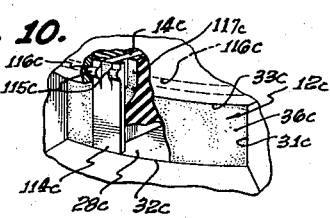
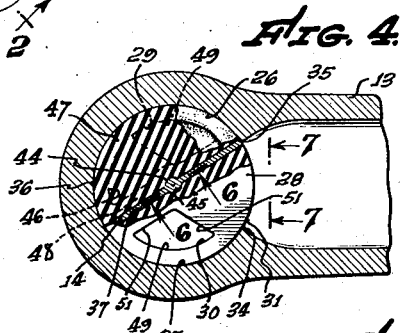
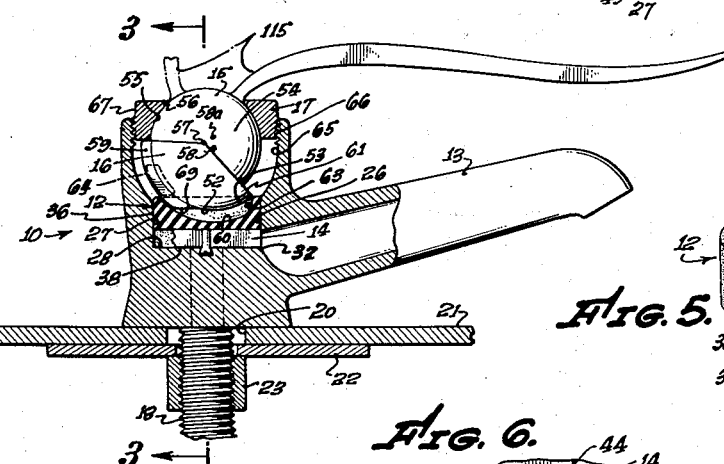
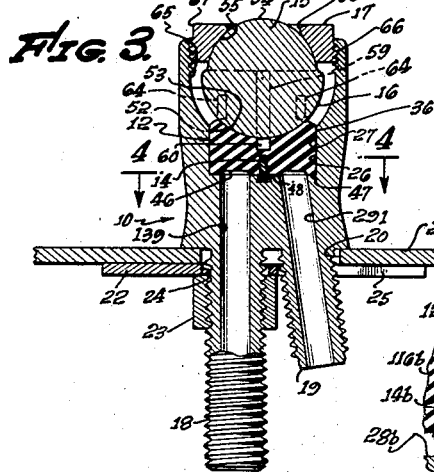
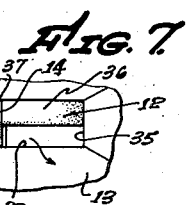
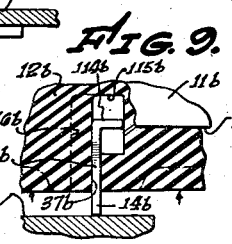
INVENTOR.
William P. Green

United States Patent Office 2,884,007
Patented Apr. 28, 1959

2,884,007

MIXING VALVES

William P. Green, San Marino, Calif.

Application March 19, 1954, Serial No. 417,416

26 Claims. (Cl. 137—625.13)

This invention relates to improved proportioning valves, for varying the relative rates of fluid flow between a pair of passages respectively and a common chamber. The present valves are in certain respects especially desirable for use as hot and cold water mixing valves, and will be discussed below as applied to that use. Some features of the present valves have been disclosed and claimed in my copending application Number 352,863 filed May 4, 1953 on "Dual Action Handles."

The valves of the present invention are preferably designed to vary both the total rate of fluid flow through a pair of passages, and the relative proportions of that flow passing through the two passages respectively. Thus, when utilized as a hot and cold water mixing device, a valve embodying the invention varies both the total rate of water discharge, and the temperature of the discharged water, each of these conditions desirably being controllable entirely independently of the other. Particularly contemplated is a valve of this type which acts very positively to completely close off all water discharge in the closed condition of the valve, specifically by a positive seating type engagement of a valve element with a seat rather than by a non-seating type of slide valve closure.

Structurally, a device embodying the invention may include a seat structure containing a pair of openings through which two fluids (hot and cold water) flow. Opposite the seat structure, I provide a main valve unit or valve means, typically a circular element formed of rubber or other resiliently deformable sealing material, which unit is movable toward and away from the seat structure, and acts by such movement to vary the total rate of fluid flow through the openings. The two water discharge openings and the valve seats thereabout may face essentially axially toward this valve unit, so that the latter may seat against the seat structure entirely about each of the openings individually, to assure complete and positive closure of both openings in the closed condition of the valve.

The means for controlling the proportioning of the hot and cold water may be so designed as to vary the proportioning independently of the axial positioning of the above discussed seating valve. For maximum simplicity of operation, the seating valve may be mounted for rotation in addition to its axial movement, and may serve to control actuation of the proportion means in accordance with that rotation.

The proportioning of hot and cold water may be varied by movement relative to the seat structure of means extending axially between the seating valve unit and seat at a location to divide or separate the hot water from the cold. In order that such movement of these divider means may effectively proportion the hot and cold water, the fluid discharged laterally from between the valve element and seat may be closed off partially about the space between the valve and seat, so that the divider acts to control the water discharged at only a predetermined discharge location or locations. In order that rotation of the seating valve may serve to control the proportioning of the hot and cold water, the divider means may be connected to the valve unit or element for rotation therewith.

The main seating valve may be movable within a circular recess in the valve body, and may form an annular seal with the wall of that recess in a manner preventing fluid leakage to the location of an actuating handle. Upwardly beyond the seal, the seating valve may have an upper curved and preferably substantially spherical surface for engaging the actuating element or handle, which may be of a novel cam or wedge type. Also at that upper side, the valve unit may have a shoulder or shoulders for transmitting rotary movement from the actuating element to the valve unit, these shoulders typically being formed as side walls of a transverse recess in the upper spherical surface of the valve unit.

The handle or actuating element may control the two types of valve movement by swinging movement in two different directions. To facilitate assembly and disassembly of the device, the actuating element may be held in operative position, and guided for its two types of valve actuating movements, by a backing element which is threadedly connected to the valve body, in a manner such that removal of that element frees all other parts for removal from the body. Also, this element may be so mounted that its adjustment relative to the body serves to properly adjust the actuating element for completely closing off the valve in a proper position of the handle.

The above and other features and objects of the present invention will be better understood from the following detailed description of the typical embodiments illustrated in the accompanying drawing, in which:

Fig. 1 is a perspective view of a hot and cold water mixing valve embodying the invention;

Fig. 2 is an enlarged vertical section taken on line 2—2 of Fig. 1;

Fig. 3 is a transverse vertical section taken on line 3—3 of Fig. 2;

Fig. 4 is a horizontal section taken primarily on line 4—4 of Fig. 2;

Fig. 5 is an exploded perspective of the main seating valve element and the divider;

Figs. 6 and 7 are enlarged sections taken on lines 6—6 and 7—7 respectively of Fig. 4;

Figs. 8 and 9 are front fragmentary views of two variational forms of valve element and divider; and Fig. 10 is a perspective view of another variational form of divider.

In the drawing I have shown a hot and cold water mixing valve 10, including a valve or faucet body 11 which may typically be formed of brass. A valve element 12 within the body controls the rate of water discharge from the valve through a delivery spout portion 13 of the body. The relative proportions of hot and cold water delivered through the spout, and consequently the temperature of the discharged water, are varied by rotary movement of a divider or separator 14 at the underside of valve element 12. The flow controlling movements of both the valve element 12 and divider 14 are effected by manual operation of an actuating member 15, having an elongated swinging handle portion 115, and an inner camming or wedging end 16 which engages and acts against the upper surface of valve element 12. As will appear, vertical swinging movement of handle 115 acts to vary the total amount of water discharged, while horizontal swinging movement of the handle controls the proportioning of the hot and cold water. At its upper side, the enlarged camming end 16 of member 15 bears upwardly against a retaining or backing element 17, whose disconnection from the body frees all of the other parts 12, 14, and 15 for upward removal from the body.

At its underside, body 11 forms a pair of downwardly projecting externally threaded tubular water inlet pipes 18 and 19, to be connected respectively to a pair of hot and cold water supply lines. These inlet pipes 18 and 19 may project downwardly through an opening 20 in a horizontal portion 21 of a basin or other mounting structure. The upper enlarged portion of body 11 may bear downwardly against the surface of basin wall 21, while an attaching plate 22 may be tightened upwardly against the underside of the basin wall by a nut 23 threaded onto the vertical inlet pipe 18. Plate 22 is of a size to engage the underside of basin wall 21 substantially entirely about opening 20, and may have a first circular opening 24 for passing inlet pipe 18, and a second and somewhat enongated slot 25 for passing the angular second inlet pipe 19.

At the upper side of body 11, a recess 26 extends downwardly into the body for receiving the various working parts of the valve. This recess 26 has a lower cylindrical portion with a vertically extending cylindrical sidewall 27. The bottom of this cylindrical lower portion of recess 26 is defined by a horizontally or transversely extending valve seat surface or seat structure 28, containing a pair of diametrically opposed upwardly facing openings 29 and 30, through which hot and cold water from passages 291 and 139 in the inlet pipes may flow upwardly into the lower portion of body recess 26 when permitted by valve element 12. The planar horizontal seat surface 28 extends entirely about each of the water inlet openings 29 and 30 individually, and is engageable by valve element 12 in a seating relation entirely about each of those openings individually to positively close off all water discharge in the closed position of the valve.

Water may flow from the lower portion of recess 26 into the passage within discharge spout 13 through an opening 31 in the forward side of cylindrical wall 27. The bottom of this opening 31 is defined by an outer horizontal edge portion 32 of seat surface 28. The top of opening 31 is defined by a horizontal edge 33 extending parallel to and spaced upwardly above bottom edge 32. The opposite sides of opening 31 are defined by two parallel vertical side edges 34 and 35, which are preferably spaced about 60° apart circularly about the axis of cylindrical wall 27. As will be understood, all of the edges 32, 33, 34, and 35 defining opening 31 lie in the cylindrical plane of wall 27. Beyond opening 31 in the direction of water flow into the passage within spout 13, the cross sectional area of the water flow passage increases rapidly, so that the water flow is relatively unrestricted beyond opening 31.

Valve element 12 is preferably formed of a deformable resilient sealing material, such as a suitable type of rubber which is capable of withstanding both hot and cold water. Element 12 is horizontally circular, desirably having a cylindrical vertical side wall 36 which engages body wall 27 and forms an annular fluid tight seal therewith above opening 31 leading to the spout. In order to assure the formation of such a fluid tight seal above opening 31, to thus positively prevent the leakage of any water upwardly past element 12 toward the actuating member 15, the outer surface 36 of element 12 may have a normal external diameter which is slightly greater than the diameter of body wall 27, so that the resilience of the material of element 12 causes that element to bear rather tightly outwardly against the engaged body wall.

At its underside, element 12 contains a narrow recess 37, which extends vertically or axially upwardly into the material of element 12, and which extends diametrically entirely across the circular valve element. Divider 14 comprises a thin vertical partition of a thickness corresponding substantially to the width of recess 37 in element 12, and which extends upwardly into that recess. Divider 14 may be rectangular, as shown, and of a length to extend entirely diametrically across the lower cylindrical portion of recess 26, with the bottom horizontal edge 38 of the divider engaging seat surface 28 between openings 29 and 30, and with the vertical end edges 39 engaging cylindrical body wall 27 except at the location of opening 31.

When valve element 12 is permitted to move upwardly away from seat 28 to an open water discharging position, divider 14 does not move upwardly with the valve element, but instead remains in its illustrated position of contact with seat surface 28, to prevent cross flow or mixture of the hot and cold water before their passage through opening 31 and into the spout. Divider 14 has a vertical extent such that its upper edge portion always remains in recess 37 of the valve element, even in the uppermost fully opened position of the valve element. As will be understood, rotation of element 12 about its vertical axis acts to correspondingly turn divider 14, whose rotary position determines the relative proportions of hot and cold water delivered to the discharge spout.

Divider 14 is retained against seat surface 28 by reception of an integral depending projection 40 on the divider within an upwardly facing recess 41 formed in the body at the center of circular seat 28. Recess 41 is circular, and progressively enlarges downwardly (see Fig. 6). The depending projection 40 on divider 14 has a circular or short cylindrical portion 40a directly beneath the divider of an external diameter corresponding substantially to the diameter of the engaged uppermost small dimension portion of the wall of recess 41. Beneath its cylindrical portion 40a, projection 40 forms a pair of downwardly diverging detent fingers 42, which are resiliently and normally urged relatively apart to bear against the downwardly enlarging circular sidewall of recess 31. The resilience of fingers 42, and the downwardly flaring configuration of these fingers and recess 41, are such as to continuously urge divider 14 downwardly against seat 28. The outer surfaces of fingers 42 may taper or curve inwardly at 43, at the lower ends of the fingers, and to a diameter less than the upper reduced end of recess 41, so that fingers 42 may be forced or snapped downwardly into recess 41, with the fingers being automatically wedged inwardly as they pass through the upper reduced end of recess 41. After fingers 42 have passed into recess 41, the fingers resiliently snap relatively apart against the wall of the recess, to positively retain the divider downwardly against seat 28, while permitting rotation of the divider about the vertical axis of element 12 with that element.

In order to strengthen the connection between divider 14 and its depending projection 40, there may be provided at opposite sides of the divider a pair of partial cylindrical vertical enlargements 44, of a diameter corresponding to the upper cylindrical portion 40a of projection 40, and forming in effect an upper cylindrical continuation of the projection extending to the upper edge of the divider. For receiving this cylindrical portion 44 of the divider, the recess 37 within element 12 has a correspondingly widened cylindrical central portion 45.

Divider 14 is preferably formed of such a material and given such dimensions as to cause its main portion to be rigid, to withstand the forces exerted thereagainst by the water while at the same time allowing fingers 42 to have the desired resilient deformability for serving their holding function. It is contemplated that the divider may be formed of a suitable water and temperature resistant molded resinous plastic material, such as nylon, as for instance the particular nylon sold by E. I. du Pont de Nemours under the designation "Nylon FM 10001." If desired, divider 14 may of course be formed of a suitable water resistant metal having the desired resilience, as for instance stainless steel.

The valve element 12 and divider 14 are adapted to turn to any position between a first extreme position in which only cold water is allowed to discharge into the spout, and a second extreme position in which only hot water may discharge. The parts are in these extreme positions when the front edge 39 of the divider is moved to positions of engagement with side edges 34 and 35 respectively of the opening 31 leading into spout 13. As will be brought out later, the actuating handle 115 and body 11 are so designed as to limit the rotary movement of the valve element and divider at these extreme positions, the total range of such rotary movement typically being about 60°.

The valve element 12, seat surface 28, and openings 29 and 30 are so designed that the valve element will seat downwardly against surface 28 entirely about each of the openings 29 and 30 and will do so in any of the various rotary positions of the valve element within its permitted range of rotary movement. The seating undersurface of element 12 maybe be planar, if desired, but desirably instead is recessed upwardly at the portions 46 of the valve element which are received over openings 29 and 30 in the various rotary positions of the valve element. About these recessed areas 46, the valve element 12 forms a pair of endless or continuous seat engaging surfaces, having outer substantially semi-circular portions 47 and inner parallel substantially diametrical portions 48 at opposite sides of divider 14. These seating surfaces 46 and 47 may lie in a common horizontal plane, and are adapted to seat against surface 28 entirely about each of the openings 29 and 30 in all permitted rotary positions of element 12.

The water inlet openings 29 and 30 in the seat structure may be of any size and shape which will permit of the desired seating of element 12 entirely about each opening individually in all of the rotary positions of element 12. For example, these openings may be circular where maximum simplicity is of primary importance. However, in order to allow for the greatest possible area of opening for a given size of valve element, I prefer to shape openings 29 and 30 as seen in Fig. 4. Specifically, each of the openings is there defined by an outer arcuate edge 49, extending along the inside of an arcuate outer seat surface 50 to be engaged by surface 47 of the valve element, and a pair of straight generally radially extending lines 51.

The camming portion 16 of actuating element 15 has a convex spherical undersurface 52 engaging and acting against a concave essentially spherical upper surface 53 of valve element 12. Also, portion 16 has a second and upper convex spherical surface 54 bearing upwardly against an annular concave partial spherical surface 55 of ring 17. The swinging handle portion 115 of element 15 projects upwardly and then horizontally forwardly from camming portion 16, and extends through an upper circular opening 56 of ring 17, which opening is of a sufficient size to permit vertical swinging movement of the handle through a predetermined substantial range of movement.

Spherical surfaces 54 and 55 are of a common diameter and are centered about a common center 57 lying on the vertical axis of element 12, so that the engagement of these spherical surfaces acts to guide the handle for both horizontal and vertical swinging movements. The camming portion of the handle is urged tightly upwardly against backing surface 55 by the force of the pressurized water exerted upwardly against the underside of valve element 12.

The spherical undersurface 52 of portion 16 of the actuating element is eccentric with respect to spherical surfaces 54 and 55, to act as a cam or wedge surface for wedging valve element 12 downwardly against seat surface 28 in response to downward swinging movement of the handle. The center about which spherical surface 52 is formed is preferably so positioned with respect to center 57 that the center of surface 52 moves almost entirely vertically, or axially, and has a minimum of horizontal or transverse movement, upon vertical swinging movement of handle 115 through its permitted range of movement. For instance, in the closed valve position of Fig. 2, the center of surface 52 may be at a point 58 offset to the right of and slightly lower than center 57. When handle 115 has then been swung upwardly to the fully opened broken line position of Fig. 2, the center of surface 52 may have moved to a point 58a which is offset to the right of but somewhat higher than center 57. To assure an absolute minimum of horizontal movement of the center of surface 52, the point 58 should be the same distance below center 57 as point 58a is above center 57.

When the device is thus designed so that the center of surface 52 has almost no horizontal movement, the surface 52 will fit very nicely into the single substantially spherical upper surface 53 of valve element 12 in all vertical positions of the handle. Surface 53 of course has substantially the same diameter as engaged surface 52, but if desired the cavity formed by surface 53 may be slightly enlarged in the direction in which surface 52 moves thereacross, and to an extent just suffiicient to allow for the very slight horizontal movement of the center of surface 52 when that center moves from either of the points 58 or 58a to a point vertically midway therebetween.

Horizontal swinging or rotary movement of handle 115 about the vertical axis of element 12 is transmitted to that element by reception of a depending rib 59 of portion 16 of the handle element within a diametrically extending groove or recess 60 formed in element 12 beneath its upper substantially spherical surface 53. This rib 59 is of a width corresponding substantially to groove 60, and has vertical sidewalls engaging vertical sides of the groove to effectively transmit horizontal turning movement to element 12 in all vertical positions of the handle.

The upward swinging movement of handle 115 may be limited by the engagement with the underside of ring 17 of a shoulder 61 formed on portion 16 of element 15 at the juncture between upper surface 54 and under surface 52; also, the swinging movement may be limited by the engagement of the end 69 of rib 59 with an end 63 of groove 60. Desirably, both of these sets of stop shoulders contact simultaneously, to serve together as positive limits on the upward swinging movement of the handle. The horizontal swinging movement of handle 15 may be limited at the previously described positions in which the front of divider 14 contacts edges 34 and 35 respectively of opening 31, by engagement of rib 59 laterally against a pair of circularly spaced lugs 64 projecting inwardly from the upper increased diameter portion 65 of the wall of body recess 26.

The upper backing ring 17 is threadedly connected at 66 into the upper end of body recess 26. In addition to alowing for assembly and disassembly of the device, this threaded connection between ring 17 and the body allows for vertical adjustment of portion 16 of member 15, to determine the position at which the handle will completely close the valve. The upper enlarged portion 65 of body recess 26 may have essentially arcuately flaring sidewalls, as shown, and may be sufficiently large to permit all of the described movements of portion 16 of the handle, and also to permit substantial vertical adjustment of the handle.

In assembling the device, the divider 14 may first be inserted into recess 37 of valve element 12, following which these two parts may be inserted as a unit downwardly into recess 26 of the body. When valve element 12 is pressed downwardly against seat 28, projection 40 of the divider will snap into recess 41, and thereafter hold the divider downwardly against the seat. The actuating member 15 may then be placed in position, and ring 17 screwed into the body by means of a wrench acting against the upper polygonal portion 67 of the ring. The ring is tightened downwardly to a position in which the valve element 12 is wedged tightly into seating engagement with surface 28 when handle 15 is in its Fig. 2 position. The threaded connection 66 is desirably sufficiently tight to then frictionally retain ring 17 in the position to which it is adjusted. To render more positive this retention of ring 17 in its adjusted position, I may under certain circumstances provide a suitable set screw 68, or a lock nut, which will hold the ring in a desired position.

After the device has been assembled in this way, handle 15 will act to control both the amount of water discharged through spout 13, and the temperature of the water discharged. The amount of water discharged is controlled by vertical swinging movement of the handle between its full line and broken line positions of Fig. 2. In the full line position the handle wedges element 12 downwardly against seat 28 to positively close off all water discharge. As the handle is swung upwardly from that position, valve element 12 is allowed to move upwardly away from seat 28, and to thereby progressively increase the total rate of water delivery by increasing the height of the water passing gap between element 12 and the seat. The materials from which member 15, valve element 12, and ring 17 are made are so selected as to very effectively frictionally retain the handle in any position to which it is actuated. The primary holding effect may be attained by element 12, which may be formed of a type of rubber having a relatively high coefficient of friction with respect to the engaged surface of the member 15. The temperature of the water discharged is controlled by horizontal swinging movement of handle 115, about the vertical axis of element 12, to thereby turn divider 14 in a manner varying the circular extents of the portions of opening 31 that communicate with the hot and cold water supply openings 29 and 30 respectively. As will be apparent, the divider may be set in this way to deliver only hot water, or only cold water, or any desired intermediate mixture for producing a particular intermediate water temperature.

Fig. 8 is a fragmentary front view of a variational form of valve element and divider, as seen from a line corresponding to line 7—7 of Fig. 4. The valve element 12a of Fig. 8 may be constructed substantially the same as element 12 of Figs. 1–7, except that in Fig. 8 the divider 14a is formed as an integral part of element 12a. Specifically, divider 14a comprises a pair of oppositely directed flexible flaps or lips 114a, connected to the body element 12a at 115a. These two flaps 114a extend diametrically entirely across the underside of element 12a, as does the connecting portion 115a of the element. As will be understood, when the main portion of element 12a is moved upwardly away from seat structure 28a, the pressure of the hot and cold water at opposite sides of the divider 14a acts against flaps 114a to hold the flaps down against the seat structure, and thus cause the flaps to continuously separate the hot and cold water beneath the valve element. In the closed position of the Fig. 8 valve, flaps 114a are received upwardly within recesses 116a in the valve element. Preferably, flaps 114a normally tend to bear downwardly against seat structure 28a by virtue of their own resilience, and do so even in the fully open condition of the valve. It is contemplated that if desired the divider may be so formed that its resilience serves as the primary or only force for holding the divider down against the seat, in which case it would be unnecessary to give the divider the illustrated flapped configuration.

Fig. 9 is a view corresponding to Fig. 8, but showing a further variational form of valve element 12b and divider 14b. In this form, the divider is substantially the same as divider 14 of Figs. 1 to 7, except that divider 14b is provided at its upper end with a horizontally turned portion 114b, which extends diametrically entirely across element 12b within a recess 115b formed in and also extending entirely across element 12b. In this Fig. 9 arrangement, the divider 14b is held down against seat 12b by the pressure differential between the upper and lower sides of horizontal portion 114b of the divider.

For this purpose, some of the water from the left side of the divider is directed upwardly alongside the divider through one or more passages or recesses 116b, which extend upwardly into element 12b adjacent the divider, but do not extend along the entire diametrical extent of the divider. This water is allowed to flow into transverse recess 115b, which recess is closed at its opposite ends by the cylindrical wall of the valve body 11b. At the front side of valve element 12b, the upper edge 33b of the opening leading into the spout is at the same level as portion 114b of the divider, to allow free escape of air or water forwardly from the portion of recess 115b which is beneath portion 114b of the divider, so that the pressure at the underside of portion 114b is substantially less than the pressure at its upper side. The divider thus acts as a piston which is always held down against the seat regardless of the vertical position of valve element 12b. The divider is supported laterally by sliding reception in a vertical diametrical recess 37b in valve element 12b, the side walls of this recess engaging and guiding the divider except at the locations of recesses 115b and 116b.

Fig. 10 shows a final form of divider, as seen in perspective from a point just forwardly of the opening 31c leading into the spout. In this form, the divider 14c may be shaped substantially the same as divider 14 of the first form, but at each of its two opposite ends is laterally enlarged to provide a widened portion 114c having two resilient detent lugs 115c which are yieldingly urged by their own resilience into an annular groove 116c formed in the cylindrical wall of the body above opening 31c. As will be understood, when the valve element and divider 14c are forced downwardly toward operative positions within the body, lugs 115c are first deflected inwardly by the engaged body wall into recesses 117c formed in the valve element 12c, and when the parts reach their operative positions, lugs 115c snap radially outwardly into groove 116c, to positively retain the divider against seat 28c regardless of the vertical position of the valve element. Lugs 115c are of course horizontally movable within the groove to allow rotary movement of the valve and divider. In this form of the invention, and in forms of Figs. 8 and 9, it will be understood that the dimensions and positioning of the water passing openings in the seat structure, as well as any of the other portions of the device, may be altered as necessary or desirable to allow use of the illustrated changed forms of divider and valve element, in place of the parts employed in the main form of Figs. 1 to 7.

I claim:

1. A mixing valve comprising a valve seat structure containing two openings communicating separately with a pair of inlet passages containing two separate fluids to be mixed, a valve unit movable along an axis toward and away from said seat structure to vary the total rate of discharge of said fluids through said openings, said valve unit being positioned axially opposite said seat structure and being movable to a position in which the valve unit bears axially against said seat structure in seating engagement therewith about said openings and thereby closes off the discharge of both of said fluids, both of said openings being positioned to face generally axially of said valve unit and toward the valve unit, said valve unit being free for rotary movement about essentially said axis relative to the seat structure in addition to said movement toward and away from the structure, and means rotatable with said valve unit and positioned axially between said valve unit and said seat structure at a location to vary the proportioning of the fluids discharged through said two axially facing openings in response to said rotation.

2. A mixing valve as recited in claim 1 in which said valve unit seats axially against said structure entirely about each of said openings individually.

3. A mixing valve comprising a valve seat structure containing two openings communicating with a pair of passages containing two separate fluids to be mixed, a valve unit movable along an axis toward and away from said seat structure to vary the total rate of discharge of said fluids through said openings, said valve unit being positioned axially opposite said seat structure and being movable to a position in which the valve unit bears axially against said structure in seating engagement therewith about the portions thereof containing said openings and thereby closes off the discharge of both fluids through said openings, and means operable to vary the proportioning of the fluids discharged through said two openings respectively, said means including divider means interposed between and separating said two fluids between said valve unit and seat structure, said divider means being movable and operable by said movement to vary said proportioning of the two fluids, said valve unit being constructed to seat axially against said seat structure entirely about both of said openings individually.

4. A mixing valve as recited in claim 1 including wall means closing off the discharge of said fluids laterally from between said valve unit and seat structure for a portion of the distance thereabout, said means which rotate with the valve unit acting to control the proportioning of the discharge for the rest of the distance about the valve unit and structure.

5. A mixing valve comprising a valve seat structure containing two openings communicating with a pair of passages containing two separate fluids to be mixed, a valve unit movable along an axis toward and away from said seat structure to vary the total rate of discharge of said fluids through said openings, said valve unit being positioned axially opposite said seat structure and openings and movable to a position in which the valve unit seats on said structure and closes off the discharge of both fluids through said openings, said valve unit being free for rotary movement relative to the seat structure about essentially said axis of movement of said valve unit toward and away from said seat structure, and means operable to vary the proportioning of the fluids discharged through said two openings respectively, said means including divider means separating said two fluids axially between said valve unit and seat structure and rotatable with said valve unit and acting by said rotation to vary said proportioning.

6. A mixing valve as recited in claim 5 in which said divider means are axially extensible and contractable relative to said valve unit in accordance with the spacing between said unit and structure.

7. A mixing valve as recited in claim 6 in which said divider means comprise an element telescopically received within a recess in said valve unit, there being a connection holding said element against said seat structure regardless of the axial positioning of the valve unit but allowing rotation of the element with the valve unit.

8. A mixing valve comprising a valve seat structure containing two openings communicating with a pair of passages containing two separate fluids to be mixed, a circular valve unit movable along an axis toward and away from said seat structure to vary the total rate of discharge of said fluids through said openings, said valve unit being positioned axially opposite said seat structure and openings and movable to a position in which the valve unit seats on said structure and closes off the discharge of both fluids through said openings, said valve unit being free for rotary movement relative to the seat structure about essentially said axis of movement of said unit toward and away from said structure, a wall having a partial circular portion extending partially about the space between said valve unit and seat structure and closing off fluid discharge laterally from between the unit and structure partially thereabout, and divider means extending diametrically of said circular valve unit and said wall and rotatable with said valve unit and acting by said rotation to vary the proportioning of said fluids discharged from said two openings.

9. A mixing valve as recited in claim 8 in which said wall has a completely circular portion beyond said partial circular portion, said valve unit including seal means annularly and movably engaging said completely circular portion of the wall in fluid sealing relation.

10. A mixing valve comprising a body containing a recess having a cylindrical wall, a seat structure formed at the inner end of said recess and containing two openings communicating with a pair of passages in the body for containing two separate fluids to be mixed, a circular valve element in said recess movable along an axis toward and away from seating engagement with said structure and rotatable about said axis, said body containing a fluid discharge passage communicating with said recess through an opening which is near said seat structure and extends only partially thereabout, a divider extending axially between said valve element and seat structure at a location between said openings to separate said two fluids while they are between said element and structure, said divider being free for rotary movement relative to said body and seat structure and acting by said movement to vary the proportioning of said two fluids delivered to said discharge passage, means connecting said divider to said valve element for rotary movement therewith, and an actuating unit operable to move said valve unit both axially and rotatably.

11. A mixing valve as recited in claim 10 in which said valve element is engageable axially against said seat structure entirely about both of said openings therein individually.

12. A mixing valve as recited in claim 11 in which said actuating unit has a cam portion acting against said valve element within said recess, there being a backing member threadedly connected to said body beyond said actuating unit and against which the latter bears, said backing member and said cam portion of the actuating unit having engaging surfaces guiding the latter for swinging movement both about said axis and about a second and transverse axis.

13. A mixing valve as recited in claim 12 in which said valve element is formed of a single piece of deformable sealing material engaging said seat structure and said actuating unit and annularly engaging said cylindrical wall of the body in fluid tight sealing relation, said divider extending diametrically of said valve element within a recess extending upwardly thereinto, there being a connection between said divider and body holding the divider against the seat structure in all positions of the valve element but allowing rotary movement of the divider with the valve element.

14. A mixing valve including a seat structure containing two openings communicating with a pair of passages for containing two separate fluids to be mixed, a valve unit positioned axially opposite said seat structure and mounted for movement along an axis toward and away from said structure, said valve unit being engageable with the seat structure in a seating relation acting to close off fluid discharge from the two openings, an actuating unit engaging said valve unit at a side opposite its seat engaging side, means guiding said actuating unit for swinging movement about said axis and about a second axis extending essentially transversely of the first, said actuating unit and valve unit having curved interengaging surfaces of essentially a common curvature extending eccentrically with respect to said second axis and acting to displace said valve element axially in response to swinging movement of the actuating unit about said second axis, and means acting to vary the proportioning of the fluids discharged from said two openings in response to rotary movement of the actuating unit about said first axis.

15. A mixing valve as recited in claim 14 in which said interengaging surfaces on the actuating unit and valve unit are substantially spherical, said valve unit being rotatable about said first axis and acting to transmit rotary movement thereabout from said actuating unit to said proportioning means, there being interengaging shoulders on said actuating unit and said valve unit transmitting rotary movement about said first axis therebetween.

16. A mixing valve comprising a seat structure containing a pair of openings through which two separate fluids to be mixed are discharged, a valve unit mounted for movement along an axis toward and away from seating engagement with said seat structure and operable to close off the discharge of said fluids through said openings, an actuating unit having a cam portion bearing against said valve unit and mounted for swinging movement about said axis and about a second essentially transverse axis, said actuating unit acting to axially displace the valve unit in response to swinging movement about said second axis, and means controlling the proportioning of said two fluids in accordance with swinging movement of the actuating unit about said first axis, said valve unit including a single piece of material directly engaging both said seat structure and said cam portion of the actuating unit.

17. A mixing valve comprising a seat structure containing a pair of openings through which two separate fluids to be mixed are discharged, a valve unit mounted for movement along an axis toward and away from seating engagement with said seat structure and operable to close off the discharge of said fluids through said openings, an actuating unit having a cam portion bearing against said valve unit and mounted for swinging movement about said axis and about a second essentially transverse axis, said actuating unit acting to axially displace the valve unit in response to swinging movement about said second axis, said valve unit being rotatable about said first axis by said actuating unit, means controlling the proportioning of said two fluids in accordance with said rotary movement of the valve unit, a stationary cylindrical wall movably engaged by said valve unit in annular fluid tight sealing relation, there being a fluid discharge passage communicating with the space axially between said seat structure and valve unit, said valve unit including a one piece deformable element engaging both said wall and said actuating unit.

18. A mixing valve comprising a seat structure containing a pair of openings through which two separate fluids to be mixed are discharged, a valve unit mounted for movement along an axis toward and away from seating engagement with said seat structure and operable to close off the discharge of said fluids through said openings, said valve unit being rotatable about said axis, means for varying the proportioning of said fluids in accordance with said rotation of the valve unit, a stationary cylindrical wall disposed about said axis and movably engaged in annular fluid tight sealing relation by an outer surface of said valve unit, there being a fluid discharge passage communicating with the space axially between said seat structure and valve unit, said valve unit including a one-piece element of deformable sealing material engaging both said seat structure and said cylindrical wall.

19. For use in a mixing valve; a circular valve unit centered about an axis and adapted to be mounted in a valve body for rotary movement about said axis and for axial movement therealong, said unit having a seating face at a first axial side moveable axially into seating engagement with a seat structure containing two fluid passing openings and acting to close off fluid flow through said openings, said valve unit having at its second axial side a curved camming surface which is engageable by an actuating element to cam the unit axially and which has an approximately circular curvature whose center is offset laterally from said axis of the valve unit.

20. A valve unit as recited in claim 19, in which said curved camming surface is approximately spherical, and said valve unit has a shoulder at said second axial side engageable by a shoulder on the actuating element in accordance with turning movement of the actuating element.

21. A valve unit as recited in claim 20 in which said valve unit has at said first axial side a diametrically extending recess adapted to telescopically receive a divider for separating two fluids from said two openings while the fluids are between said unit and seat structure.

22. For use in a mixing valve; a valve unit comprising a circular one piece body of deformable sealing material centered about an axis and adapted to be mounted in a valve body for both rotary movement about said axis and axial movement therealong, said sealing material forming a seating face at a first axial side of the body movable axially into seating engagement with a seat structure containing two fluid passing openings and acting to close off fluid flow through said openings, and the same piece of sealing material forming an annular essentially radially outwardly facing sealing surface centered about said axis and movably engageable in fluid tight sealing relation with a cylindrical surface in the body.

23. A valve unit as recited in claim 22 in which said deformable material of the body has at its second axial side a camming surface engageable by an actuating element to wedge the body axially, said camming surface being substantially spherical and centered about a point offset laterally from said axis of the body, said body having a transverse groove at said second axial side adapted to movably receive a projection on the actuating element in a relation transmitting rotary movement between the element and body, and said body containing a narrow diametrical recess at said first axial side adapted to telescopically receive a divider for separating fluids from said two openings.

24. A mixing valve comprising a body containing a recess having a cylindrical wall, a seat structure formed at the inner end of said recess and containing two openings communicating with a pair of passages in the body for containing two separate fluids to be mixed, a circular valve element in said recess movable along an axis toward and away from seating engagement with said structure to vary the total rate of discharge of said fluids through said openings, said valve element being rotatable about said axis, means operable to vary the proportioning of the two fluids discharged through said openings in accordance with said rotary movement of the valve element, said element in any of different rotary settings being movable axially to a closed position in which the element bears axially against said seat structure in seating engagement therewith about the portions thereof containing said openings to close off the discharge of both fluids through said openings, said body containing a discharge passage communicating with said recess at a location near said seat structure, said valve element being constructed to, in each of said different rotary settings, seat axially against said seat structure entirely about each of said openings separately from the other, to thereby positively prevent cross-leakage between the openings in said closed position of the valve unit, said valve element having a portion annularly and movably engaging said recess wall in fluid tight sealing relation at a location outwardly beyond said location at which the discharge passage communicates with the recess, an actuating unit engaging said valve element at a side opposite its seat engaging side and mounted for swinging movement about said axis and about a second axis extending generally transversely of the first, said actuating unit having a cam portion acting to displace said valve unit axially upon swinging movement of the actuating unit about said second axis, and shoulders on said valve unit and actuating unit acting to transmit rotary motion about said first axis from the actuating unit to the valve unit.

25. A mixing valve comprising a valve seat structure containing two openings communicating with a pair of passages containing two separate fluids to be mixed, a flow controlling structure including a valve unit which is movable along an axis toward and away from said seat structure and is operable by said movement to vary the total rate of discharge of said fluids through said openings, said flow controlling structure being free for rotary movement about essentially said axis relative to said seat structure, said flow controlling structure including means operable to vary the proportioning of the two fluids discharged through said openings in accordance with said rotary movement of the flow controlling structure, said flow controlling structure being constructed to, in any of different rotary settings, seat axially against said seat structure about said openings and to thereby close off the discharge of said fluids from said openings, and said flow controlling structure being constructed to, in each of said different rotary settings, seat axially against said seat structure entirely about each of said openings separately from the other, to thereby positively prevent cross-leakage between the openings in closed position of said flow controlling structure.

26. A mixing valve as recited in claim 17, in which said one piece deformable element which engages said wall and said actuating unit also engages said seat structure to close off the discharge of said fluids through said openings.

References Cited in the file of this patent

UNITED STATES PATENTS

| | | |
|---|---|---|
| 2,501,657 | Barkelew | Mar. 28, 1950 |
| 2,639,116 | Green | May 19, 1953 |

FOREIGN PATENTS

| | | |
|---|---|---|
| 643,408 | Great Britain | of 1950 |